United States Patent
Han

(10) Patent No.: US 7,658,503 B2
(45) Date of Patent: Feb. 9, 2010

(54) BACKLIGHT UNIT FOR LIQUID CRYSTAL DISPLAY DEVICE

(75) Inventor: Young Bae Han, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 260 days.

(21) Appl. No.: 11/448,682

(22) Filed: Jun. 8, 2006

(65) Prior Publication Data

US 2007/0091587 A1     Apr. 26, 2007

(30) Foreign Application Priority Data

Oct. 26, 2005   (KR) ................... 10-2005-0101202

(51) Int. Cl.
  *G09F 13/04*   (2006.01)
  *G09F 13/08*   (2006.01)
(52) U.S. Cl. .................. 362/97.2; 362/97.4; 362/633
(58) Field of Classification Search ................ 362/295, 362/630–631, 97.1–97.4, 632–633; 257/98–100
See application file for complete search history.

(56) References Cited

U.S. PATENT DOCUMENTS

| | | | |
|---|---|---|---|
| 6,871,979 B2 * | 3/2005 | Mai | 362/241 |
| 7,108,385 B2 * | 9/2006 | Huang et al. | 362/631 |
| 2004/0080925 A1 * | 4/2004 | Moon | 362/29 |
| 2006/0268568 A1 * | 11/2006 | Oku et al. | 362/561 |

FOREIGN PATENT DOCUMENTS

| | | |
|---|---|---|
| CN | 1492270 | 4/2004 |
| JP | 2003-330424 | 11/2003 |
| JP | 2005-284079 | 10/2005 |
| JP | 2005-284080 | 10/2005 |
| WO | 2004/104658 | 12/2004 |

* cited by examiner

*Primary Examiner*—Jason Moon Han
(74) *Attorney, Agent, or Firm*—Morgan Lewis & Bockius LLP

(57) ABSTRACT

A backlight unit for a liquid crystal display (LCD) device includes a light source, a bottom cover to receive the light source, a diffuser positioned to diffuse light irradiated from the light source, and resistors positioned between the bottom cover and the light source.

14 Claims, 3 Drawing Sheets

BACKLIGHT UNIT FOR LIQUID CRYSTAL DISPLAY DEVICE

The present invention claims the benefit of Korean Patent Application No. 10-2005-0101202 filed in Korea on Oct. 26, 2005, which is hereby incorporated by reference.

BACKGROUND OF THE INVENTION

1. Field of the Invention

The present invention relates to a backlight unit for a liquid crystal display (LCD) device, and more particularly to a backlight unit for an LCD device that effectively reduces an induction current by generated by parasitic capacitance by inserting a resistor in a reflection film.

2. Discussion of the Related Art

In the current information society, the roles of electronic display devices become increasingly important, such that various types of electronic display devices are used in the diverse industrial sectors. Accordingly, the electronic display devices having new functions are continuously developed to meet the demands of the information society. In general, an electronic display device refers to a device for visually presenting the information to humans. Specifically, the electronic display device converts electronic information signals output from the various electronic apparatus into optical information signals recognizable by humans. Thus, the electronic display device serves as a mediator between humans and the electronic apparatus.

There are two types of display devices: a light emission type and a light receiving type. The light emission type display device displays light information signal according to an illumination phenomenon. The light emission type display device is also called an active display device and includes a cathode ray tube (CRT), a plasma display panel (PDP), an organic electroluminescent display (OELD), a light emitting diode (LED), and the like. The light receiving type display device displays light information signal that has been light-converted according to a reflection, scattering, and interference phenomenon. The light receiving type display apparatus is also called a passive display device and includes the LCD, an electrophoretic image display (EPID), and the like.

The CRT has been employed for televisions and/or computer monitors and still occupies a high market share in terms of economical efficiency. However, due to its disadvantages, such as heavy weight, bulky size, and higher power consumption, the CRT is facing challenges competing against the flat panel display devices. Recently, the rapid advancement of the semiconductor techniques allows various electronic devices to improve their power consumption, their sizes, and their weights. Accordingly, the flat panel displays devices such as the LCD, the PDP and the OELD devices have been developed. Specifically, the LCD devices are developed having small and thin size, light weight, low power consumption, and low drive voltage.

Since the LCD devices are light receiving type display devices, they need a light source such as a backlight unit. There are two types of backlight units for the LCD devices: a direct type backlight unit and a light guide plate type backlight unit. The direct type backlight unit is constructed such that a plurality of lamps are arranged on a plane and a diffuser is inserted between the lamps and a liquid crystal panel to maintain a space between the liquid crystal panel and the lamps. The light guide plate type backlight unit is constructed such that lamps are installed at an outer edge of a flat panel and light received from the lamps is irradiated onto the liquid crystal panel by using a transparent light guide plate. The direct type backlight unit is commonly used for the LCD device because it has a high light utilization rate and can be easily handled.

A related art backlight unit for an LCD device will be described with reference to FIGS. 1 and 2. FIG. 1 is a cross-sectional view showing parasitic capacitance formed between lamps of a related art backlight unit for an LCD device and a bottom cover. FIG. 2 is a view showing waveforms of a high level voltage applied to the lamps and an induction current generated by the parasitic capacitances between the lamps and the bottom cover.

As shown in FIG. 1, the related art backlight unit for an LCD device comprises a plurality of lamps 13 arranged in parallel with each other to irradiate light, a bottom cover 15 for receiving the lamps 13, and a reflection film 14 positioned between the bottom cover 15 and the lamps 13. Each of the lamps 13 includes inert gases (Ar and Ne) inside a glass tube, and a cathode and an anode installed at end portions of the glass tube. The glass tube filled with the inert gases therein has phosphor coating on an inner wall of the glass tube.

When an AC voltage is applied to the anode and the cathode of each of the plurality of lamps 13 from an inverter (not shown), electrons are discharged from the cathode to collide with the inert gases inside the glass tube. The amount of electrons increases by geometric progression. When a current flows inside the glass tube owing to the increased electrons, the inert gases are excited by the electrons, thus generating energy that excites the molecules to emit ultraviolet rays. The ultraviolet rays collide with illuminative phosphor that is coated on the inner wall of the glass tube, thereby emitting visible light.

The bottom cover 15 is made of a metallic material. As shown in FIG. 1, parasitic capacitance C1, C2, and C3 are generated between the lamps 13 and between the lamps 13 and the reflection film 14/bottom cover 15. Specifically, the parasitic capacitance C1 is formed between the lamp 13 and one side of the bottom cover 15, the parasitic capacitance C2 is formed between the lamps 13, and the parasitic capacitance C3 is formed between the lamps 13 and the lower bottom cover 15. As shown in FIG. 2, when a high level voltage is applied to drive the plurality lamps 13, an induction current is generated by the parasitic capacitances C1, C2, and C3. Since the induction current is induced by the parasitic capacitances C1, C2, and C3, it is noted that the phase difference between the induction current and the high level voltage is $\pi/2(90°)$. The induction current does not go to driving of the plurality of lamps 13, thus decreasing illumination efficiency of the lamps 13.

SUMMARY OF THE INVENTION

Accordingly, the present invention is directed to a backlight unit for liquid crystal display device that substantially obviates one or more of the problems due to limitations and disadvantages of the related art.

An object of the present invention is to provide a backlight unit that effectively improves the illumination efficiency of lamps by reducing the induction current generated by parasitic capacitance formed between the lamp and the bottom cover.

Additional features and advantages of the invention will be set forth in the description which follows, and in part will be apparent from the description, or may be learnt by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the backlight unit for a liquid crystal display (LCD) device includes a light source, a bottom cover to receive the light source, a diffuser positioned to diffuse light irradiated from the light source, and resistors positioned between the bottom cover and the light source.

In another aspect, the backlight unit for a liquid crystal display (LCD) device includes a lamp array including a plurality of lamps to irradiate light, a bottom cover to receive the lamp array, a diffuser positioned at an upper portion of the lamp array to diffuse light irradiated from the plurality of lamps, an optical film positioned at an upper portion of the diffuser to change a proceeding direction of light that passes through the diffuser such that the proceeding direction of light is perpendicular to the diffuser, and resistors positioned between the bottom cover and the lamp array and facing the plurality of lamps.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

A backlight unit for a liquid crystal display (LCD) device in accordance with an exemplary embodiment of the present invention will be described with reference to FIGS. 3 to 5.

Figure 1:
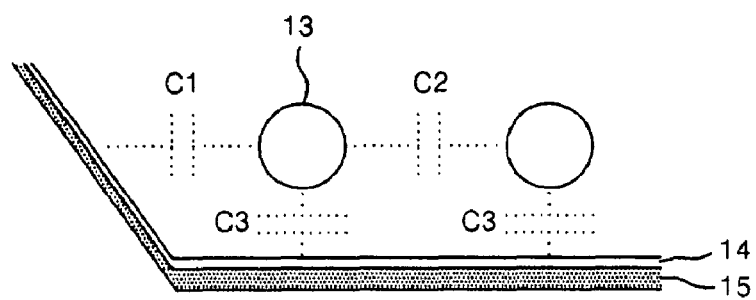
FIG. 1 illustrates a cross-sectional view showing parasitic capacitances formed between lamps and a bottom cover of a related art back light unit for a liquid crystal display (LCD) device.
Figure 2:
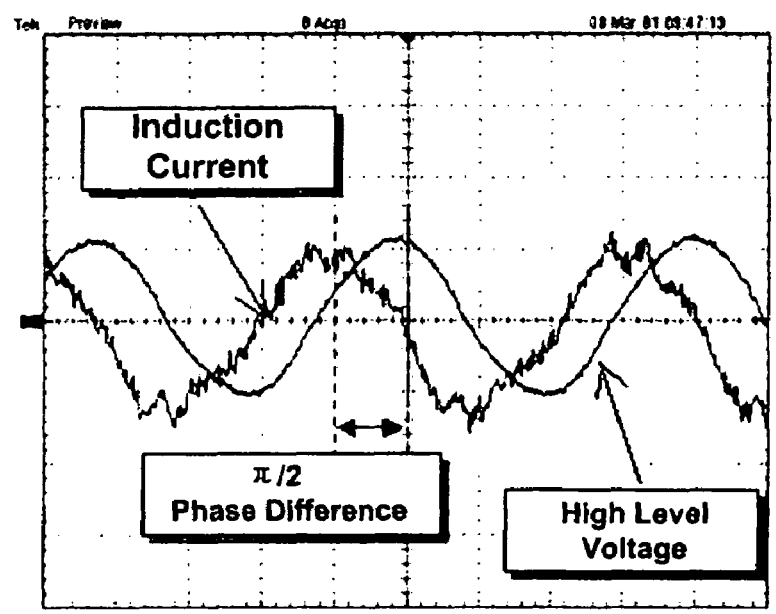
FIG. 2 illustrates waveforms of a high level voltage applied to the lamps and an induction current generated by the parasitic capacitances of FIG. 1.
Figure 3:
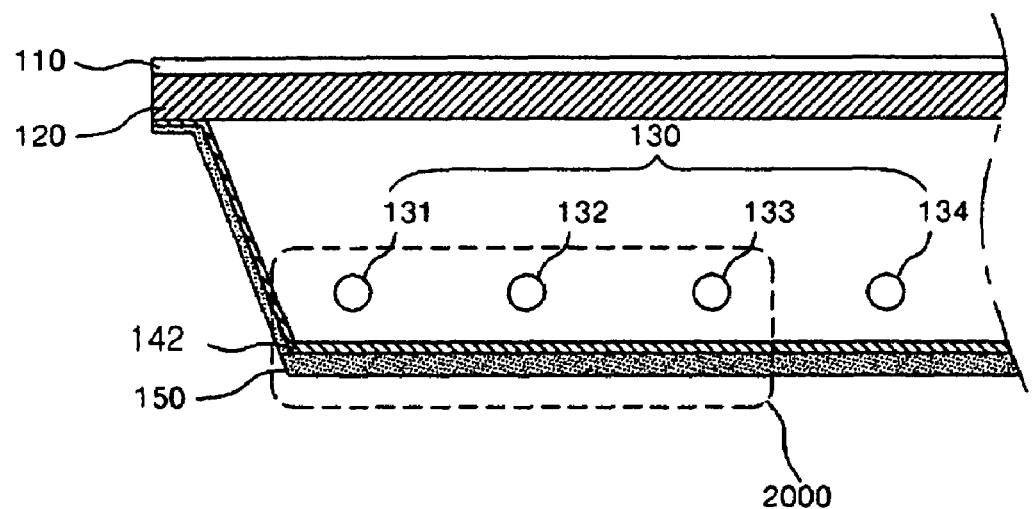
FIG. 3 illustrates a cross-sectional view of a backlight unit for an LCD device in accordance with an exemplary embodiment of the present invention.

FIG. 3 is a cross-sectional view of a backlight unit for an LCD device. FIG. 4 is a cross-sectional view showing lamps, a reflection film, and a bottom cover of FIG. 3. FIG. 5 is a plan view of the exemplary lamp array of FIG. 3.

Figure 4:
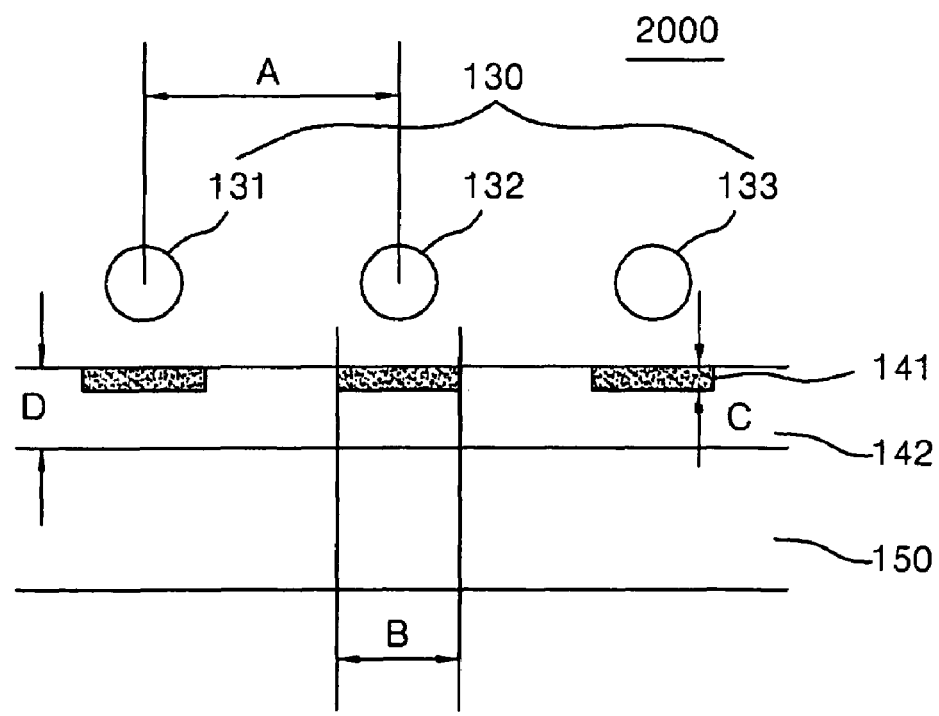
FIG. 4 illustrates a cross-sectional view showing lamps, a reflection film, and a bottom cover of FIG. 3.

As shown in FIGS. 3 and 4, the backlight unit for the LCD device in accordance with the exemplary embodiment of the present invention comprises a lamp array 130 that includes a plurality of lamps 131 to 134 arranged in parallel with each other to irradiate light, a bottom cover 150 for receiving the lamp array 130, a diffuser 120 positioned at an upper portion of the lamp array 130, an optical film 110 disposed at an upper portion of the diffuser 120, a reflection film 142 disposed between the bottom cover 150 and the lamp array 130, and resistors 141 formed in the reflection film 142. The plurality of lamps 131 to 134 of the lamp array 130 may be cold cathode fluorescent lamps (CCFLs) or external electrode fluorescent lamps (EEFLs). Each lamp includes inert gases (Ar and Ne) inside a glass tube and a cathode and an anode are installed at end portions of the glass tube. Inert gases are filled inside the glass tube and phosphor is coated on an inner wall of the glass tube. Other types of lamps may be used without departing from the scope of the invention.

When an AC voltage is applied to the anode and the cathode of each of the plurality of lamps 13 from an inverter (not shown), electrons are discharged from the cathode to collide with the inert gases inside the glass tube, so that the amount of electrons increases by geometric progression. When a current flows inside the glass tube due to the increased electrons, the inert gases are excited by the electrons, thus generating energy that excites the molecules to emit ultraviolet rays. The ultraviolet rays collide with illuminative phosphor coated on the inner wall of the glass tube, thereby emitting visible light.

The diffuser 120 is formed by coating a light diffusion member on both sides of a film made of a transparent resin. The diffuser 120 diffuses light irradiated from the plurality of lamps 131 to 134. The optical film 110 improves efficiency of the incident light passing through the diffuser 120. The optical film 110 serves to change a traveling direction of the light so as to be perpendicular to the diffuser 120. The reflection film 142 reflects light irradiated from the plurality of lamps 131 to 134 toward the diffuser 120.

As shown in FIG. 4, the reflection film 142 is positioned between the bottom cover 150 and the lamp array 130. The reflection film further includes resistors 141 formed to face each of the plurality of lamps 131 to 134. The reflection film 142 is made of micro-forming polyethylene terephthalate (MCPET), and reflects light while preventing light irradiated by each of the plurality of lamps 131 to 134 from leaking. Specifically, the light reflected from the reflection film 142 that travels to the sides, front, and the rear of the lamps 131 to 134 are all directed toward the diffuser 120, thereby improving efficiency of light irradiated from the lamps 131 to 134.

The volume resistivity of the resistors 141 is preferably set at about $10^{10}$ Ωm to about $10^{19}$ Ωm with which the induction current generated by the parasitic capacitances formed between the plurality of lamps 131 to 134 and the bottom cover 150 can be effectively suppressed. The volume resistivity of the resistor 141 can be expressed by equation (1) shown below:

$$E = R*S/C \ [\Omega M] \qquad \text{[Equation 1]}$$

wherein "E" is the volume resistivity, "R" is a resistance value of the resistors 141, "S" is an area of the resistors 141 that faces each of the plurality of lamps 131 to 134, and "C" is the thickness of the resistors 141.

A ratio (B/A) of the width (B) of the resistor 141 and the distance (A) between the lamps 131 to 134 is preferably set within the range of about 0.3 to about 1, and a radio (C/D) of the thickness (C) of the resistors 141 and the thickness (D) of the reflection film 142 is preferably set within the range of about 0.05 to about 0.5. The resistors 141 can be made of melamine, phenol, acetal copolymer, acrylics, epoxy, polystyrene, styrene acrylonitrile (SAN), acrylonitrile butadiene styrene (ABS), polycarbonate, PVC (Poly Vinyl Chloride), nylon (type 6.6), acetal homopolymer, polyethylene (PE), thermoplastic polyester, polysulfone, polyphenylene oxide (PPO), polytetrafluoro ethylene (PTFE), fluoroethylene propylene (FEP), and other suitable materials. Accordingly, the resistor 141 having the volume resistivity of about $10^{10}$ Ωm to about $10^{19}$ Ωm can be easily formed.

Furthermore, the bottom cover 150 that receives the plurality of lamps 131 to 134 is made of a metallic material, for example. Accordingly, when a high level voltage is applied to drive the plurality of lamps 131 to 134, the induction current is generated due to the parasitic capacitances formed between the lamps 131 and the bottom cover 150. Thus, in the backlight unit for the LCD device according to the exemplary embodiment of the present invention, the resistors 141 having the volume resistivity of about $10^{10}$ Ωm to about $10^{19}$ Ωm, are positioned inside the reflection film 142 to reduce the induction current generated by the parasitic capacitances formed between the lamps 131 to 134 and the cover bottom 150. Accordingly, the illumination efficiency of the lamps 131 to 134 of the lamp array 130 can be effectively enhanced. As a result, the LCD device employing the backlight unit of the exemplary embodiment of the present invention improves the display quality of the LCD screen.

Figure 5:
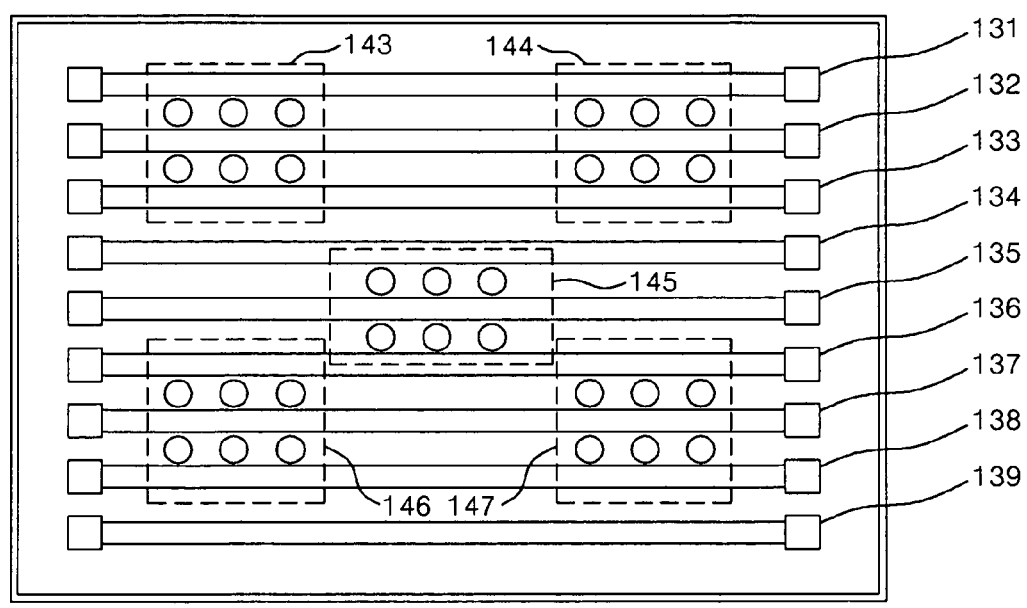
FIG. 5 illustrates a plan view of an exemplary lamp array of FIG. 3.

As shown in FIG. 5, the lamp array 130 may be formed by a combination of CCFLs 131 to 139 and LEDs 143 to 147 or a combination of EEFLs 131 to 139 and LEDs 143 to 147. Specifically, a plurality of LEDs 143 to 147 can be positioned between the CCFLs 131 to 139 or between the EEFLs 131 to 139 to improve LCD device color reproduction. Other types of light sources and different arrangements of the light sources may be used without departing from the scope of the present invention.

As described above, the backlight unit for the LCD device according to the exemplary embodiment of the present invention has the advantages that, by installing the resistors having the volume resistivity of about $10^{10}$ Ωm to about $10^{19}$ Ωm in the reflection film, the induction current generated by the parasitic capacitances that is formed between the lamps and the bottom cover can be reduced. Accordingly, illumination efficiency of the lamps of the lamp array can be effectively enhanced. Consequently, the LCD devices that employ the backlight unit of the exemplary embodiment improve the display quality of the screen.

It will be apparent to those skilled in the art that various modifications and variations can be made in the backlight unit for the liquid crystal display device of the present invention without departing from the spirit or scope of the invention. Thus, it is intended that the present invention cover the modifications and variations of this invention provided they come within the scope of the appended claims and their equivalents.

What is claimed is:

1. A backlight unit for a liquid crystal display (LCD) device, comprising:
   a light source;
   a bottom cover to receive the light source;
   a reflection film between the bottom cover and the light source to reflect light irradiated from the light source;
   a diffuser positioned to diffuse light irradiated from the light source and light reflected from the reflection film; and
   a plurality of linear resistors positioned in a predetermined distance in the reflection film, wherein each of the resistors is made from one of melamine, phenol, acetal copolymer, acrylics, epoxy, polystyrene, styrene acrylonitrile (SAN), acrylonitrile butadiene styrene (ABS), polycarbonate, PVC (Poly Vinyl Chloride), nylon (type 6.6), acetal homopolymer, polyethylene (PE), thermoplastic polyester, polysulfone, polyphenylene oxide (PPO), polytetra fluoroethylene (PTFE) and fluoroethylene propylene (FEP).

2. The backlight unit of claim 1, wherein the light source includes at least one lamp.

3. The backlight unit of claim 2, wherein the lamp is one of a cold cathode fluorescent lamp (CCFL) and an external electrode fluorescent lamp (EEFL).

4. The backlight unit of claim 2, wherein the light source further includes at least one light emitting diode (LED).

5. The backlight unit of claim 1, wherein the volume resistivity of the resistor is about $10^{10}$ Ωm to about $10^{19}$ Ωm.

6. The backlight unit of claim 1, wherein a ratio (B/A) of a width (B) of the resistor and a distance (A) between the light sources is set within a range of about 0.3 to about 1.

7. The backlight unit of claim 1, wherein a ratio (C/D) of a thickness (C) of the resistor and a thickness (D) of the reflection film is set within the range of about 0.05 to about 0.5.

8. A backlight unit for a liquid crystal display (LCD) device, comprising:
   a lamp array including a plurality of lamps to irradiate light;
   a bottom cover to receive the lamp array;
   a reflection film between the bottom cover and the lamp array to reflect light irradiated from the lamp array;
   a diffuser positioned at an upper portion of the lamp array to diffuse light irradiated from the plurality of lamps;
   an optical film positioned at an upper portion of the diffuser to change a proceeding direction of light that passes through the diffuser such that the proceeding direction of light is perpendicular to the diffuser; and
   a plurality of linear resistors positioned at a predetermined distance in the reflection film, and facing the plurality of lamps, wherein the resistor is made from one of melamine, phenol, acetal copolymer, acrylics, epoxy, polystyrene, styrene acrylonitrile (SAN), acrylonitrile butadiene styrene (ABS), polycarbonate, PVC (Poly Vinyl Chloride), nylon (type 6.6), acetal homopolymer, polyethylene (PE); thermoplastic polyester, polysulfone, polyphenylene oxide (PPO), polytetra fluoroethylene (PTFE) and fluoroethylene propylene (FEP).

9. The backlight unit of claim 8, wherein the volume resistivity of the resistor is about $10^{10}$ Ωm to about $10^{19}$ Ωm.

10. The backlight unit of claim 8, wherein a ratio (B/A) of a width (B) of the resistor and a distance (A) between the lamps is set within a range of about 0.3 to about 1.

11. The backlight unit of claim 8, wherein a ratio (C/D) of a thickness (C) of the resistor and a thickness (D) of the reflection film is set within the range of about 0.05 to about 0.5.

12. The backlight unit of claim 8, wherein the plurality of lamps is one of a cold cathode fluorescent lamps (CCFLs) and external electrode fluorescent lamps (EEFLs).

13. The backlight unit of claim 8, wherein the lamp array further includes light emitting diodes (LEDs).

14. The backlight unit of claim 13, wherein the plurality of lamps is one of CCFLs and EEFLs.

* * * * *